(12) United States Patent
Kogut-O'Connell

(10) Patent No.: US 9,498,031 B2
(45) Date of Patent: Nov. 22, 2016

(54) IMPACT PROTECTION FOR ELECTRONIC DEVICES

(71) Applicant: International Business Machines Corporation, Armonk, NY (US)

(72) Inventor: Judy J. Kogut-O'Connell, Hopewell Junction, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 14/019,481

(22) Filed: Sep. 5, 2013

(65) Prior Publication Data

US 2015/0060324 A1    Mar. 5, 2015

(51) Int. Cl.
*B65D 85/00* (2006.01)
*A45C 11/00* (2006.01)
*A45C 13/00* (2006.01)
*A45C 13/36* (2006.01)
*H04B 1/3888* (2015.01)

(52) U.S. Cl.
CPC ............ *A45C 11/00* (2013.01); *A45C 13/001* (2013.01); *A45C 13/002* (2013.01); *A45C 13/36* (2013.01); *H04B 1/3888* (2013.01); *A45C 2011/002* (2013.01); *A45C 2011/003* (2013.01); *G06F 2200/1633* (2013.01)

(58) Field of Classification Search
CPC .... A45C 11/00; A45C 13/002; A45C 13/36; A45C 2011/002; A45C 2013/025; G06F 2200/1633; H04B 1/3888
USPC ................... 206/37, 38, 320, 453, 586, 587, 206/591–594; 248/309.1, 345.1; 361/679.55, 679.56; 455/575.1, 575.8
See application file for complete search history.

(56) References Cited

U.S. PATENT DOCUMENTS

| 3,221,872 | A | * | 12/1965 | Wood | B65D 5/5033 206/305 |
| 4,836,379 | A | * | 6/1989 | Shaw | B65D 81/107 206/453 |
| 4,925,149 | A | * | 5/1990 | DiFrancesca | B65D 81/113 206/320 |
| 5,370,229 | A | * | 12/1994 | Kroeckel | B65D 81/057 206/586 |
| 6,378,831 | B1 | * | 4/2002 | Copeland, Jr. | A47B 95/043 248/345.1 |
| 6,616,111 | B1 | * | 9/2003 | White | G06F 1/1626 206/320 |
| 8,950,582 | B2 | * | 2/2015 | Chang | B65D 81/022 206/521 |
| 2005/0023157 | A1 | * | 2/2005 | Logan | A45C 11/18 206/37 |

(Continued)

FOREIGN PATENT DOCUMENTS

CN    102638952 A    8/2012

*Primary Examiner* — Luan K Bui
(74) *Attorney, Agent, or Firm* — Marcia L. Doubet

(57) ABSTRACT

Impact protection comprises using an impact protection apparatus to protect an electronic device from damage due to an impact with a surface (for example, if the device is dropped or falls from a height), reducing the likelihood that the device will be damaged by the impact. The impact protection apparatus comprises a flexible band that is placed around a perimeter of the device, where this band has a plurality of objects integrated therein. The objects are generally disposed along a length of the band, preferably in pairs. The flexible band is capable of adapting to a shape of a perimeter of the device. Each of the objects has a height suitable for causing the device to remain at a distance above a surface on which the device is located, once the band is placed around the perimeter of the device. The band preferably has a groove into which the device is insertable, thereby enabling the band to grip the perimeter of the device.

14 Claims, 4 Drawing Sheets

(56) References Cited

U.S. PATENT DOCUMENTS

2011/0049000 A1* 3/2011 Ishibashi .............. B65D 81/053
 206/521
2011/0192743 A1* 8/2011 May ..................... A45C 13/002
 206/320
2011/0278199 A1* 11/2011 Dane ......................... A61L 2/26
 206/586
2011/0297578 A1* 12/2011 Stiehl .................. B29C 45/1676
 206/701
2013/0020229 A1 1/2013 Wyner
2013/0331155 A1* 12/2013 Tages .................. H04M 1/0283
 455/575.8
2014/0262912 A1* 9/2014 Lin ........................ A45C 11/00
 206/521

* cited by examiner

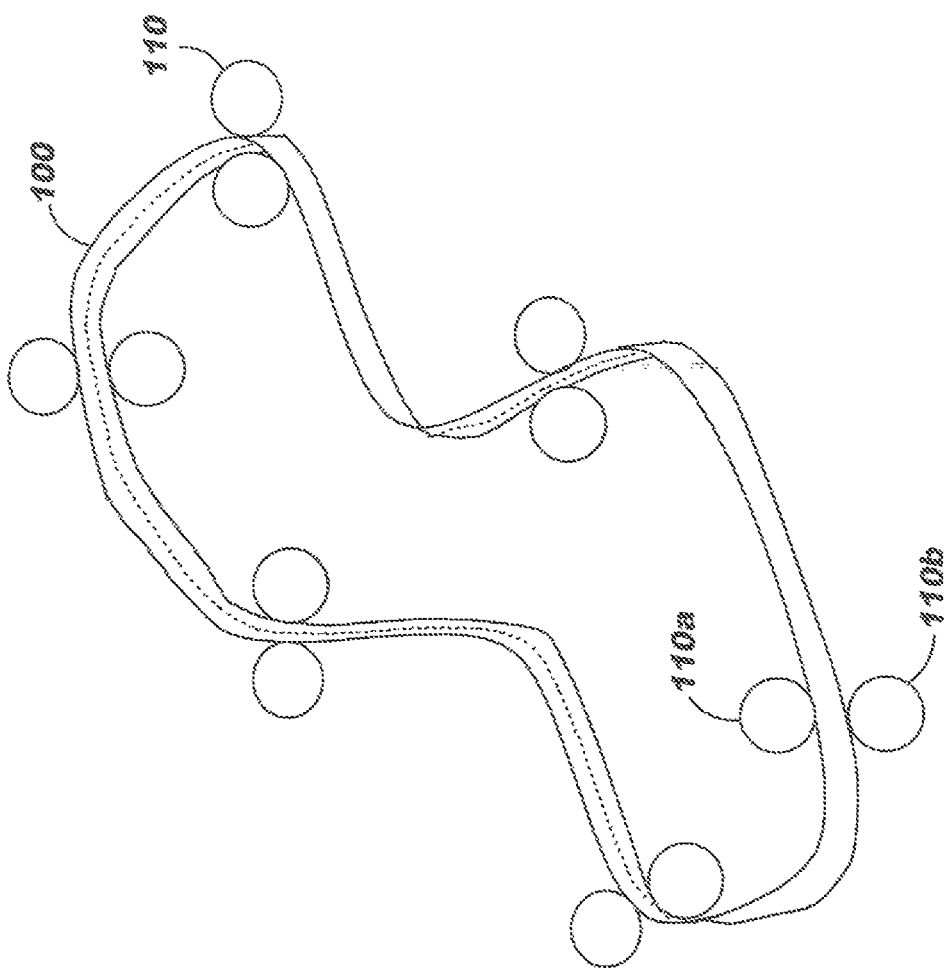

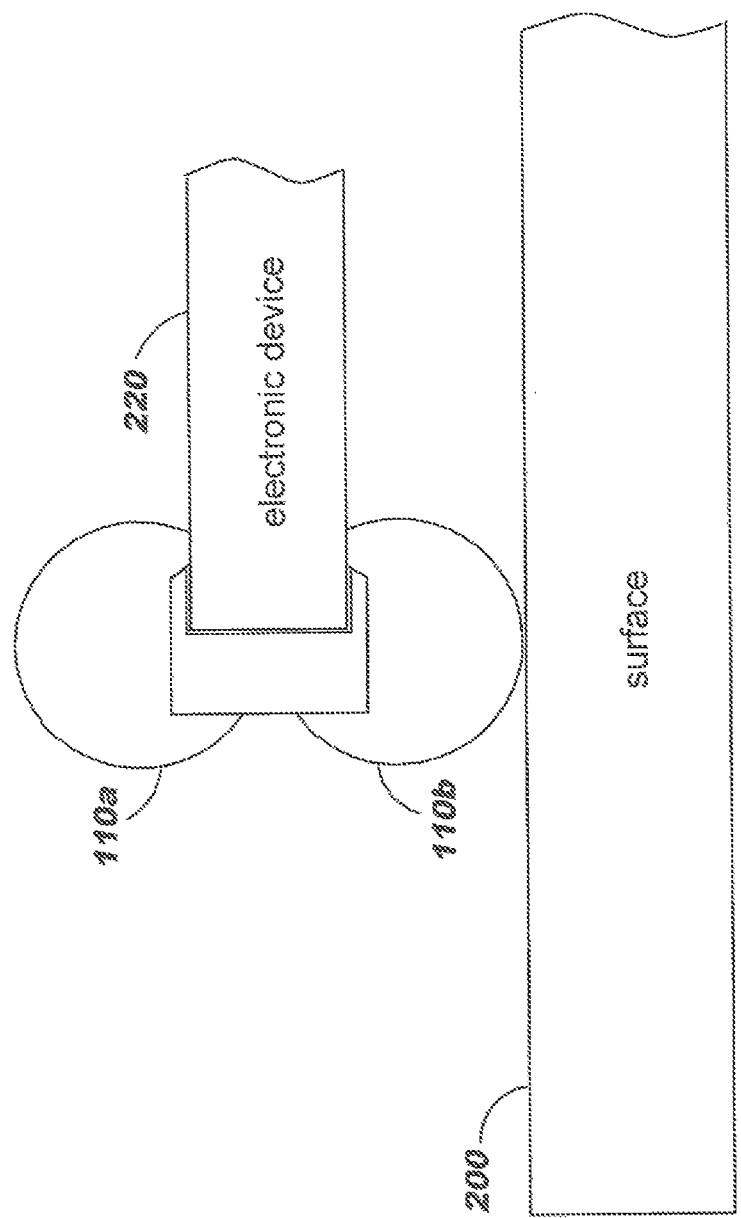

IMPACT PROTECTION FOR ELECTRONIC DEVICES

BACKGROUND OF THE INVENTION

The present invention relates to physical device protection, and deals more particularly with using an apparatus that protects an electronic device from damage due to an impact with a surface (for example, if the device is dropped from a height), reducing the likelihood that the device will be damaged by the impact.

Many people today have a number of electronic devices that are portable, relatively lightweight, and often expensive. Examples include cellular phones and smart phones, laptop computers, handheld or tablet computers, and so forth. The characteristics of these devices lead to their being used in many different environments, such as coffee shops, fitness studios and gyms, shopping malls, and so forth. If one of these devices falls to the floor or is dropped from a height, the resulting impact may cause serious damage to the device or its various components, including the screen on the front of the device. The likelihood of damaging a device in this manner may increase when the device is being used away from a conventional desk.

BRIEF SUMMARY OF THE INVENTION

The present invention provides impact protection. In one embodiment, an apparatus for providing impact protection comprises: a flexible band capable of adapting to a shape of a perimeter of a device, the band having a groove into which the device is insertable, the groove enabling the band to grip the perimeter of the device; and a plurality of objects, each of which is integrated into the band and disposed along a length of the band, the objects each having a height suitable for causing the device to remain at a distance above a surface on which the device is located after the band is placed around the perimeter of the device.

These and other aspects of the present invention may be provided in one or more embodiments. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates a flexible band, according to an embodiment of the present invention;

FIG. 2 provides a cross-sectional view of a portion of the flexible band when placed on an electronic device, according to an embodiment of the present invention;

DETAILED DESCRIPTION OF THE INVENTION

Figure 4:
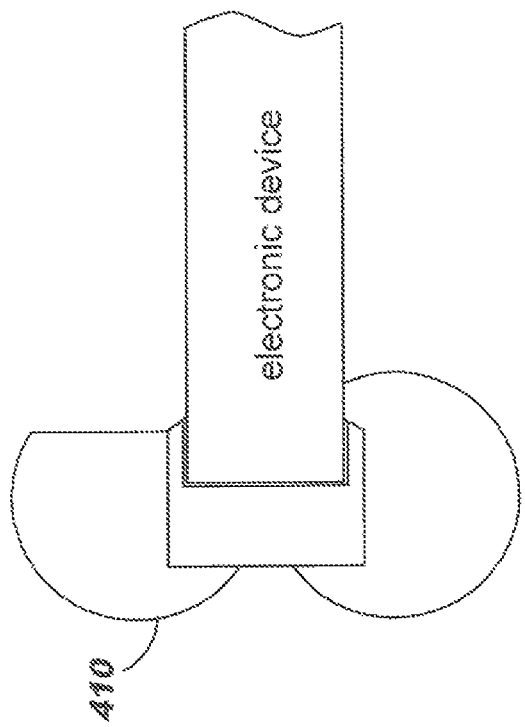
FIG. 4 depicts one alternative shape for objects integrated with the flexible band, as an aid to viewability of a surface of the device.

Embodiments of the present invention are directed toward protecting electronic devices from damage due to impact with a surface. An embodiment protects the device from an impact to the top and bottom of the device, and also from a side impact. If the device falls to the floor or is dropped from a height without benefit of such impact protection, the resulting impact may cause serious damage to the device or its various components, including the screen on the front of the device. An impact protection apparatus as disclosed herein reduces the likelihood of damage from such impact.

It is known for devices to be equipped with a protective case, such as a covering for the face of the screen (which is often made from glass), where this case allows the device to go into a sleep state when the case is closed. As one example of potential damage, if an electronic device is opened for use and therefore is not covered by the known protective case, dropping the device onto a hard surface may cause the screen to break. Replacement of the screen tends to be very costly.

It is also known to use other types of protective cases, for example, while a device is being transported. Such protective cases include padded covers or briefcases. Use of the device typically requires removal of these protective cases, and in this state, this type of protective case generally offers no protection for the device.

The lightweight nature and portability of electronic devices leads to their use in non-conventional settings, as noted earlier. A user might bring a tablet computer or smart phone to the gym, for example, and balance the device on exercise equipment (such as a treadmill) while using the equipment for exercising. If the device falls from the equipment to the gym floor, the resulting impact may break or otherwise damage the device.

Embodiments of the present invention provide impact protection using an impact protection apparatus that protects an electronic device from damage due to an impact with a surface. The impact protection apparatus comprises a flexible band that is placed around a perimeter of the device, where this band has a plurality of objects integrated therein. The objects are generally disposed along a length of the band. See FIG. 1, which illustrates an example of a flexible band 100 having integrated objects 110. The objects are preferably disposed on the band in pairs, with one of the paired objects integrated with a top portion of the band and the other paired object integrated with a bottom portion of the band. In this configuration, each of the objects in the pair is generally aligned on the same vertical axis. See objects 110a, 110b, where this alignment is illustrated. The objects 110 have a height that is suitable for causing the device to remain some distance above a surface on which the device is located. See FIG. 2, which provides a cross-sectional view of a portion of the flexible band 100 when placed on an electronic device 220 located on a surface 200. While the device 220 is on the surface 200, the integrated objects 110 cause the device 220 to remain generally raised above the surface 200. If the device 220 is dropped, or falls, to another surface (not shown in FIG. 2), the integrated objects 110 cause the device 220 to remain generally raised above that other surface as well.

The flexible 100 band is intended to remain on the electronic device while a user views or otherwise interacts with the device, and while the user desires to take advantage of the impact protection provided by the flexible band as disclosed herein. Thus, the band may remain on the device at all times. Alternatively, the band may be removed when desired by the user, and the flexibility of the band aids in its removal.

Because the band is flexible, it is capable of adapting to the shape of the device perimeter. Notably, this flexibility means that device-specific band shapes are not required. Some electronic devices may be generally rectangular, for example, while others have various degrees of rounding on the corners. A flexible band may be used on more than one device of the band owner, flexibly conforming to the shape of each such device, thereby reducing cost of ownership. Cost to manufacturers of the disclosed flexible bands may also be reduced, in that the manufacturer does not need to produce bands in device-specific shapes.

The flexible band is preferably composed of a stretchable material, so that it will fit devices for which the device perimeter falls within a particular range. It is anticipated that bands of at least 3 different lengths may be suitable for protecting a wide range of electronic devices. Bands for protecting tablet-type devices may come in 2 different lengths, for example, generally corresponding to the perimeter of an average-sized tablet and of a mini-sized tablet, while a single length band may be suitable for protecting cell phones and smart phones.

The material used to make the flexible band may be, by way of example, an elastic injection molded rubber, plastic, or a poly-stretch material, and include materials made from recycled products. The band is preferably waterproof (and preferably washable as well).

Figure 3:
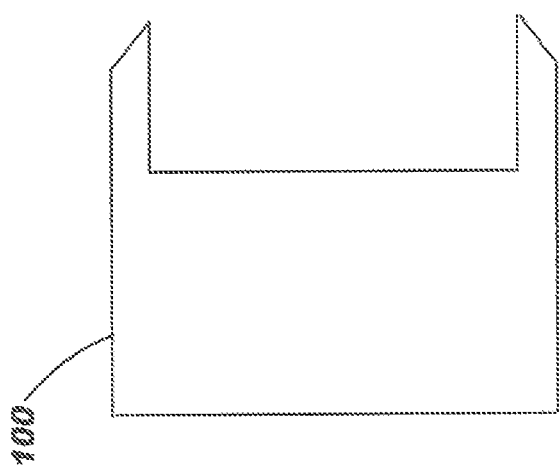
FIG. 3 illustrates a cross-sectional view of a groove in the flexible band, the groove enabling the band to grip an electronic device.

In an embodiment, the flexible band is configured to have a groove into which the device is inserted for use, where this groove enables the band to grip the perimeter of the device, thereby providing a snug fit so that the band will not unintentionally slip off. See FIG. 3, which illustrates a cross-sectional view of a groove in the flexible band, the groove enabling the band to grip an electronic device (not shown in FIG. 3).

Referring now to the objects which are integrated in the band, the objects are preferably composed of a solid substance which does not collapse upon impact. The substance may instead bounce upon impact. As with the flexible band, the objects are preferably waterproof and washable. Preferably, the process which integrates the objects into the band prevents the objects from separating from the band. The objects may be generally of a spherical shape, and may have at least some portion of the sphere cut away to aid in placement against the device. See objects 110a, 110b of FIG. 2, where a cross-sectional view of this cut-away spherical shape (also referred to herein simply as a spherical shape) is illustrated. Notably, while the spherical shape is of a height chosen to protect the device from an impact to the front or back (i.e., to the top or bottom) of the device, such shape will also protect the device if the device lands on its side when it falls. Shapes other than spheres may be used without deviating from the scope of the present invention, however, while still protecting the device from impact. As one example, a further portion of the object shape may be cut away, to thereby allow the device user to see the screen with no visual impediment—that is, without a complete inner portion of the sphere extending across a portion of the device screen. See FIG. 4, where an example of such object shape is illustrated at 410. As another example of an object shape that may be used with an embodiment of the present invention, objects such as miniature rubber footballs might be integrated into the band to appeal to sports fans, where these miniature footballs are of a height suitable for raising the device a distance above a surface. As yet another example, a car dealership might advertise by giving away flexible bands with miniature rubber cars integrated into the band, where these miniature cars are also of a suitable height. Objects of many other shapes may be envisaged in view of the present disclosure, including whimsical shapes, and it should be noted that the objects integrated into a particular band are not necessarily identical.

Figure 6:
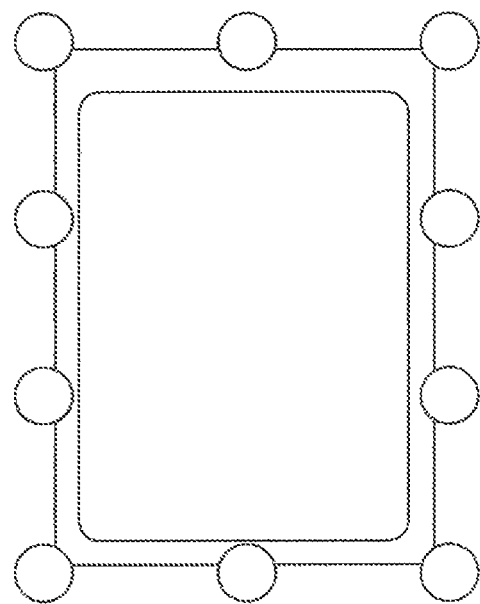
FIGS. 5 and 6 depict top views of a device with the flexible band attached thereto.
Figure 5:
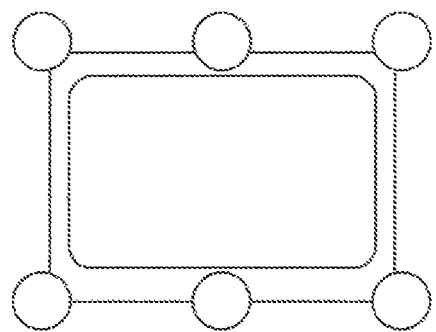

The objects may be disposed along the length of the flexible band at roughly equidistant locations. As one example, the objects may be ¾-inch spherical shapes which are placed 3 inches apart along the length of the band. Alternatively, the objects may be spaced apart by non-uniform distances. In one embodiment, the objects are placed on the band in a paired configuration such that a pair of objects is generally located at each corner of the device, and one or more other objects may then be located at other positions. By way of non-limiting example, on a smaller-length band intended for use on a phone, it may be suitable to use pairs of objects in 6 locations on the band, where pairs of objects are generally placed at each of the 4 corners as well as 1 pair of objects being generally placed in the middle of each of the 2 longer sides. See FIG. 5, where this is illustrated by a top view showing objects integrated within a band that has been placed around the perimeter of a device. A longer-length band intended for use on a larger device may use a pair of objects at each corner as well as having 1 or more pairs of objects along each of the sides of the band. See FIG. 6, where this is illustrated by another top view.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. An impact protection apparatus, comprising:
   a flexible and stretchable band capable of placement around a perimeter of an electronic device for which a length of the perimeter falls within a predetermined fixed range, the flexibility of the band enabling the band to adapt to a shape of the perimeter of the device upon placement of the band around the perimeter, the band being removable from the device subsequent to the placement around the perimeter, the stretchability of the band enabling the band to adapt to a different perimeter shape of a second electronic device, the different perimeter shape having a different perimeter length that falls within the predetermined fixed range;
   a plurality of objects integrated into the band and disposed along a length of the band in pairs, the plurality of objects comprising at least 5 pairs of the objects, each of the objects having a height suitable for causing the device to remain at a distance above a surface on which the device is placed after the band is located around the perimeter of the device, at least a first one of the pairs of objects being disposed along the length of the band so as to contact the device at a corner of the device upon the placement of the band around the perimeter and at least a second one of the pairs of objects being disposed along the length of the band so as to contact the device at a location different from any corner of the device upon the placement of the band around the perimeter; and the band having a groove into which the device is insertable, the groove enabling the band to grip the perimeter of the device.

2. The apparatus according to claim 1, wherein an upper one of the objects in each pair is integrated into a top portion of the band and a lower one of the objects in each pair is integrated into a bottom portion of the band.

3. The apparatus according to claim 1, wherein an upper one of the objects in each pair is integrated into a top portion of the band and a lower one of the objects in each pair is integrated into a bottom portion of the band, and each of the pairs of objects is disposed along the length of the band at roughly equidistant locations.

4. The apparatus according to claim 1, wherein the plurality of objects are integrated into the band so as not to interfere with viewing a surface of the device.

5. The apparatus according to claim 1, wherein each of the plurality of objects is solid in composition.

6. The apparatus according to claim 1, wherein each of the plurality of objects is generally spherical in form.

7. The apparatus according to claim 1, wherein an inner side of each of the plurality of objects is cut away so as to not interfere with viewing a surface of the device.

8. The apparatus according to claim 1, wherein each of the plurality of objects is constructed of a material tending to bounce upon an impact with a second surface.

9. The apparatus according to claim 1, wherein the plurality of objects are disposed so as to protect the device from a side impact.

10. The apparatus according to claim 1, wherein the integration prevents the plurality of objects from being removable from the band.

11. The apparatus according to claim 1, wherein the band is constructed of a waterproof material.

12. The apparatus according to claim 1, wherein when the device is positioned upon the surface in a manner permitting viewing of a front display surface of the device, a height of the device so positioned is less than the height of the objects to thereby protect the device from an impact to the front display surface and from an impact to a back surface of the device upon the device falling onto, or being dropped onto, a second surface.

13. An impact protection apparatus, comprising:

a flexible and stretchable band capable of placement around a perimeter of an electronic device for which a length of the perimeter falls within a predetermined fixed range, the flexibility of the band enabling the band to adapt to a shape of the perimeter of the device upon placement of the band around the perimeter, the band being removable from the device subsequent to the placement around the perimeter, the stretchability of the band enabling the band to adapt to a different perimeter shape of a second electronic device, the different perimeter shape having a different perimeter length that falls within the predetermined fixed range;

a plurality of objects integrated into the band and disposed along a length of the band in pairs, the plurality of objects comprising at least 5 pairs of the objects, each of the objects having a height suitable for causing the device to remain at a distance above a surface on which the device is placed after the band is located around the perimeter of the device, wherein:

the objects in each of the pairs are disposed on the band with generally an identical vertical axis whereby an upper one of the objects in each pair is integrated into a top portion of the band and a lower one of the objects in each pair is integrated into a bottom portion of the band; and at least a first one of the pairs of objects is disposed along the length of the band so as to contact the device at a corner of the device upon the placement of the band around the perimeter and at least a second one of the pairs of objects is disposed along the length of the band so as to contact the device at a location different from any corner of the device upon the placement of the band around the perimeter; and the band having a groove into which the device is insertable, the groove enabling the band to grip the perimeter of the device.

14. An impact protection apparatus, comprising:

a flexible band capable of placement around a perimeter of an electronic device, the flexibility of the band enabling the band to adapt to a shape of the perimeter of the device upon placement of the band around the perimeter, the band being removable from the device subsequent to the placement around the perimeter;

a plurality of objects integrated into the band and disposed along a length of the band in pairs, the plurality of objects comprising at least 5 pairs of the objects, each of the objects having a height suitable for causing the device to remain at a distance above a surface on which the device is placed after the band is located around the perimeter of the device, wherein:

the objects in each of the pairs are disposed on the band with generally an identical vertical axis whereby an upper one of the objects in each pair is integrated into a top portion of the band and a lower one of the objects in each pair is integrated into a bottom portion of the band; and at least a first one of the pairs of objects is disposed along the length of the band so as to contact the device at a corner of the device upon the placement of the band around the perimeter and at least a second one of the pairs of objects is disposed along the length of the band so as to contact the device at a location different from any corner of the device upon the placement of the band around the perimeter; and the band having a groove into which the device is insertable, the groove enabling the band to grip the perimeter of the device.

* * * * *